(12) United States Patent
Hofmann

(10) Patent No.: US 11,100,588 B2
(45) Date of Patent: *Aug. 24, 2021

(54) PORTFOLIO OPTIMIZATION AND EVALUATION TOOL

(71) Applicant: American International Group, Inc., New York, NY (US)

(72) Inventor: Georg Wilhelm Hofmann, Halifax (CA)

(73) Assignee: AMERICAN INTERNATIONAL GROUP, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/853,171

(22) Filed: Apr. 20, 2020

(65) Prior Publication Data

US 2020/0250762 A1    Aug. 6, 2020

Related U.S. Application Data

(63) Continuation of application No. 14/336,632, filed on Jul. 21, 2014, now Pat. No. 10,664,914.

(51) Int. Cl.
G06Q 40/06    (2012.01)
G06Q 40/00    (2012.01)
G06Q 40/04    (2012.01)

(52) U.S. Cl.
CPC .......... G06Q 40/06 (2013.01); G06Q 40/00 (2013.01); G06Q 40/04 (2013.01)

(58) Field of Classification Search
None
See application file for complete search history.

(56) References Cited

U.S. PATENT DOCUMENTS 5,799,287 A * 8/1998 Dembo ............... G06Q 40/08
                                                      705/36 R
6,021,397 A * 2/2000 Jones ................. G06Q 40/06
                                                      705/36 R
(Continued)

FOREIGN PATENT DOCUMENTS

CA         2619200         8/2009

OTHER PUBLICATIONS

USPTO; Non-Final Office Action dated Jul. 19, 2016 in U.S. Appl. No. 14/336,632.

(Continued)

*Primary Examiner* — William J Jacob
(74) *Attorney, Agent, or Firm* — Snell & Wilmer L.L.P.

(57) ABSTRACT

A computer system configured to evaluate a portfolio comprising instruments, comprising a computer memory configured to store, for each instrument, an instrument value for each portfolio scenario in an n-dimensional matrix, a first constraint and a second constraint; and a computer processor configured to transpose the n-dimensional matrix, to determine a first solution by maximizing the product of transpose of the n-dimensional matrix and the first constraint, determine whether the first solution is within an accepted range of an acceptable risk, if the expected first solution is not within an accepted range of an acceptable risk, process the second constraint with the first solution to obtain a second solution, and determine whether the second solution is within the accepted range of the acceptable risk.

19 Claims, 5 Drawing Sheets

(56) References Cited

U.S. PATENT DOCUMENTS

| | | | | |
|---|---|---|---|---|
| 6,493,682 | B1* | 12/2002 | Horrigan | G06Q 40/00 705/35 |
| 7,634,443 | B2* | 12/2009 | Alvarado | G06Q 40/025 705/38 |
| 7,668,773 | B1* | 2/2010 | Pruitt | G06Q 40/10 705/36 T |
| 7,711,617 | B2* | 5/2010 | Rachev | G06Q 40/04 705/35 |
| 7,720,738 | B2 | 5/2010 | Thompson | |
| 7,739,173 | B2* | 6/2010 | Alvarado | G06Q 40/00 705/36 R |
| 7,822,668 | B1* | 10/2010 | Benda | G06Q 50/163 705/36 R |
| 7,873,530 | B2* | 1/2011 | Huang | G06Q 40/025 705/38 |
| 7,890,409 | B2* | 2/2011 | Rachev | G06Q 40/00 705/36 R |
| 8,315,936 | B2 | 11/2012 | Stubbs | |
| 8,756,140 | B1* | 6/2014 | Menchero | G06Q 40/06 705/36 R |
| 2003/0139993 | A1* | 7/2003 | Feuerverger | G06Q 40/08 705/36 R |
| 2004/0068454 | A1 | 4/2004 | Jacobus et al. | |
| 2004/0133490 | A1* | 7/2004 | Thompson | G06Q 40/02 705/35 |
| 2004/0186804 | A1* | 9/2004 | Chakraborty | G06Q 40/06 705/36 R |
| 2004/0199448 | A1* | 10/2004 | Chalermkraivuth | G06Q 40/06 705/36 R |
| 2005/0015326 | A1* | 1/2005 | Terry | G06Q 40/04 705/37 |
| 2007/0179908 | A1* | 8/2007 | Stubbs | G06Q 40/04 705/36 R |
| 2007/0288397 | A1* | 12/2007 | Frahm | G06Q 40/06 705/36 R |
| 2008/0249957 | A1* | 10/2008 | Masuyama | G06Q 40/06 705/36 R |
| 2009/0198629 | A1* | 8/2009 | De Prisco | G06Q 40/00 705/36 R |
| 2011/0202329 | A1* | 8/2011 | Goodnight | G06F 17/16 703/21 |
| 2012/0127893 | A1* | 5/2012 | Binder | H04L 49/101 370/255 |
| 2014/0375669 | A1* | 12/2014 | Zhang | G09G 5/02 345/589 |

OTHER PUBLICATIONS

USPTO; Final Office Action dated Mar. 27, 2017 in U.S. Appl. No. 14/336,632.
USPTO; Non-Final Office Action dated Nov. 14, 2017 in U.S. Appl. No. 14/336,632.
USPTO; Final Office Action dated Aug. 1, 2018 in U.S. Appl. No. 14/336,632.
USPTO; Non-Final Office Action dated Mar. 14, 2019 in U.S. Appl. No. 14/336,632.
USPTO; Final Office Action dated Sep. 17, 2019 in U.S. Appl. No. 14/336,632.
USPTO; Notice of Allowance dated Feb. 21, 2020 in U.S. Appl. No. 14/336,632.
Portfolio Optimization with Conditional Value-at-Risk Objective and Constraints, Krokhmal, P., Palmquist, J., and Uryasev, S., Sep. 25, 2001 (Year: 2001).
R. Tyrrell Rockafellar and Stanislav Uryasev, Optimization of conditional value-atrisk, Journal of Risk, 2 (2000), pp. 21-41.
Stanisiav Uryasev, Conditional value-at-risk: Optimization algorithms and applications, Financial Engineering News, 14 (2000), pp. 1-5.
Portfolio optimization by minimizing conditional value at risk via nondifferentiable optimization, Lim, Churlzu, et al, Aug. 31, 2007.
Essays, UK. (Nov. 2013). Conditional Value At Risk of Portfolio. Retrieved from http://www.ukessays.co.uk/essays/finance/conditional-value-at-risk-of-portfolio.php?cref=1.

* cited by examiner

PORTFOLIO OPTIMIZATION AND EVALUATION TOOL

CROSS REFERENCE TO RELATED APPLICATIONS

This application is a continuation of, claims priority to and the benefit of, U.S. Ser. No. 14/336,632 filed Jul. 21, 2014 and entitled "PORTFOLIO OPTIMIZATION AND EVALUATION TOOL," which is hereby incorporated by reference in its entirety for all purposes.

BACKGROUND

A technical problem facing those interested in evaluating large portfolios of financial instruments is that the evaluation problems are very complex and the current technical solutions for evaluating them are not efficient to permit a timely analysis. Evaluation of the portfolios are defined by many permutations, constraints, and variables, such that when a significant number of financial instruments need to be evaluated, the complexity of the problem is too large to solve in a timely and efficient matter. Current technical solutions are inefficient because the problems are not efficiently solved to permit evaluation of the financial instruments in a timely manner to react to different potential scenarios that may arise.

One specific application where this problem arises is in the evaluation of insurance portfolios. Insurance portfolios generally comprise a significant number of financial instruments, such as insurance policies. Each financial instrument within the portfolio has an expected value for a given scenario. A scenario is, for example, a different event, such as a hurricane, earthquake, flood, wind storm, hail storm, ice storm, snow event, fire, having a certain severity. Because the events vary in severity, there are many different scenarios for each type of event. It is helpful to evaluate a portfolio of insurance financial instruments under the many different events at different severity levels to determine the value of the financial instrument under each event and each severity. It is further helpful to determine how to maximize or minimize values associated with the portfolio. For example, it is desirable to evaluate how to maximize the profits of the financial instruments for a given risk, or how to determine the risk for a given desired profit. Generally, the current technical solutions for doing so are not efficient and timely to permit timely decisions based on evaluating this data. The inventions disclosed herein address that problem by providing new technical solutions that permit the timely and efficient evaluation of the portfolio such that it can be optimized. The timely evaluation permits consideration of which instruments to sell, buy, adjust pricing, or adjust policy terms.

SUMMARY

This invention includes a computer system configured to evaluate a portfolio comprising instruments, comprising a computer memory configured to store, for each instrument, an instrument value for each portfolio scenario in an n-dimensional matrix, a first constraint and a second constraint; and a computer processor configured to transpose the n-dimensional matrix, to determine a first solution by maximizing the product of transpose of the n-dimensional matrix and the first constraint, determine whether the first solution is within an accepted range of an acceptable risk, if the expected first solution is not within an accepted range of an acceptable risk, process the second constraint with the first solution to obtain a second solution, and determine whether the second solution is within the accepted range of the acceptable risk.

This invention further includes a computer-readable storage medium having embodied thereon a program, the program being executable by a computer processor to perform a method for optimizing a portfolio, the method transposing an n-dimensional matrix to determine a first solution by maximizing a product of the transpose of a n-dimensional matrix comprising for a plurality of instruments, an instrument value for a plurality of scenarios, and a first constraint; determining whether the first solution is within an accepted range of an acceptable risk; if the expected first solution is not within an accepted range of an acceptable risk, processing a second constraint with the first solution to obtain a second solution; and determining whether the second solution is within the accepted range of the acceptable risk.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
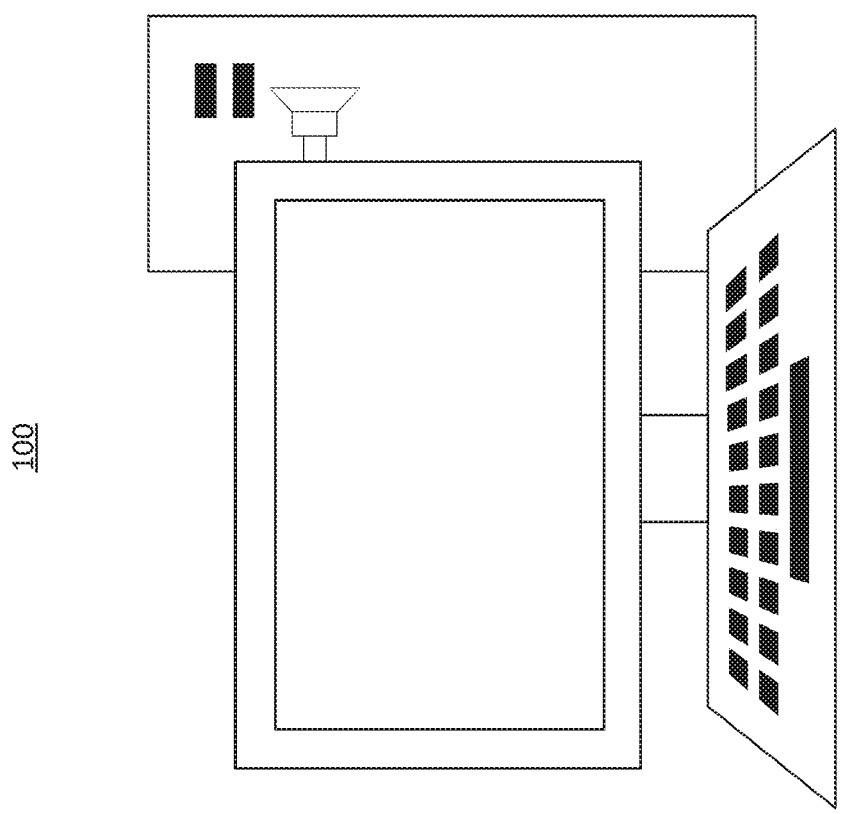
FIG. 1A is a system diagram of a computing system in which one or more disclosed embodiments of this invention may be implemented.
Figure 1B:
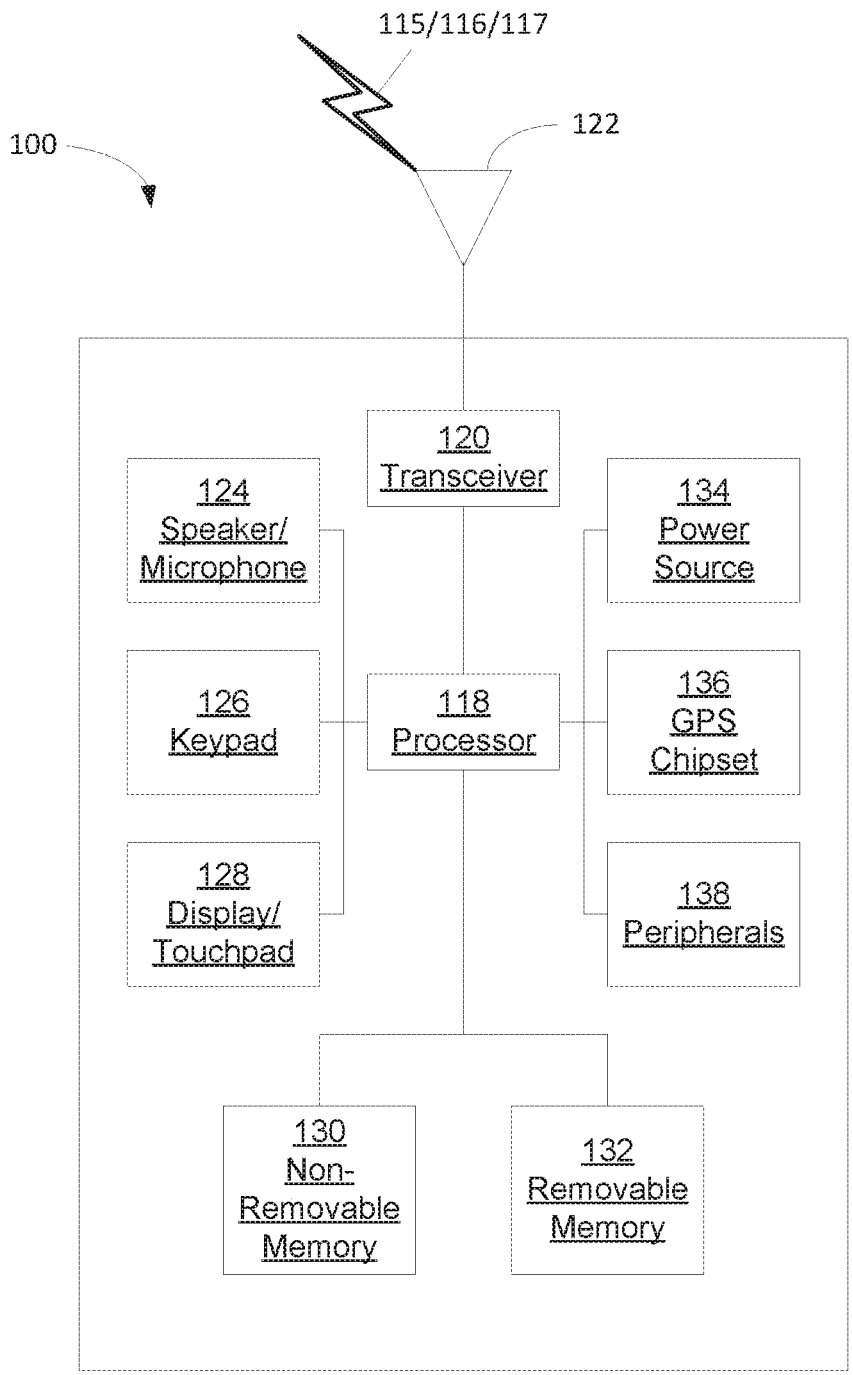
FIG. 1B is a system diagram of the computing system of FIG. 1A that can be used with one or more embodiments of this invention.

FIG. 1A is a diagram of an example computer system 100 in which one or more disclosed embodiments may be implemented. The computer system 100 may be a stand alone computer, tablet, laptop, or a mobile computer. FIG. 1B a diagram of an example computer system 100 processor 118 in which one or more disclosed embodiments may be implemented. The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the system to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The processor 118 may be coupled to, and may receive user input data from, an input device such as a speaker/ microphone 124, keypad 126, and/or a display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, for example the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located in the computing system, for example on another server or a home computer (not shown).

The processor 118 may receive power from the power source 134, and may be configured to distribute and/or control the power to the other components in the computing system 102. The power source 134 may be any suitable device for powering the computing system. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the computer system 100. In addition to, or in lieu of, the information from the GPS chipset 136, the computer system 100 may receive location information over the air interface 115/116/117 from a base station and/or determine its location based on the timing of the signals being received from two or more nearby base stations. It will be appreciated that the computer system 100 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2:
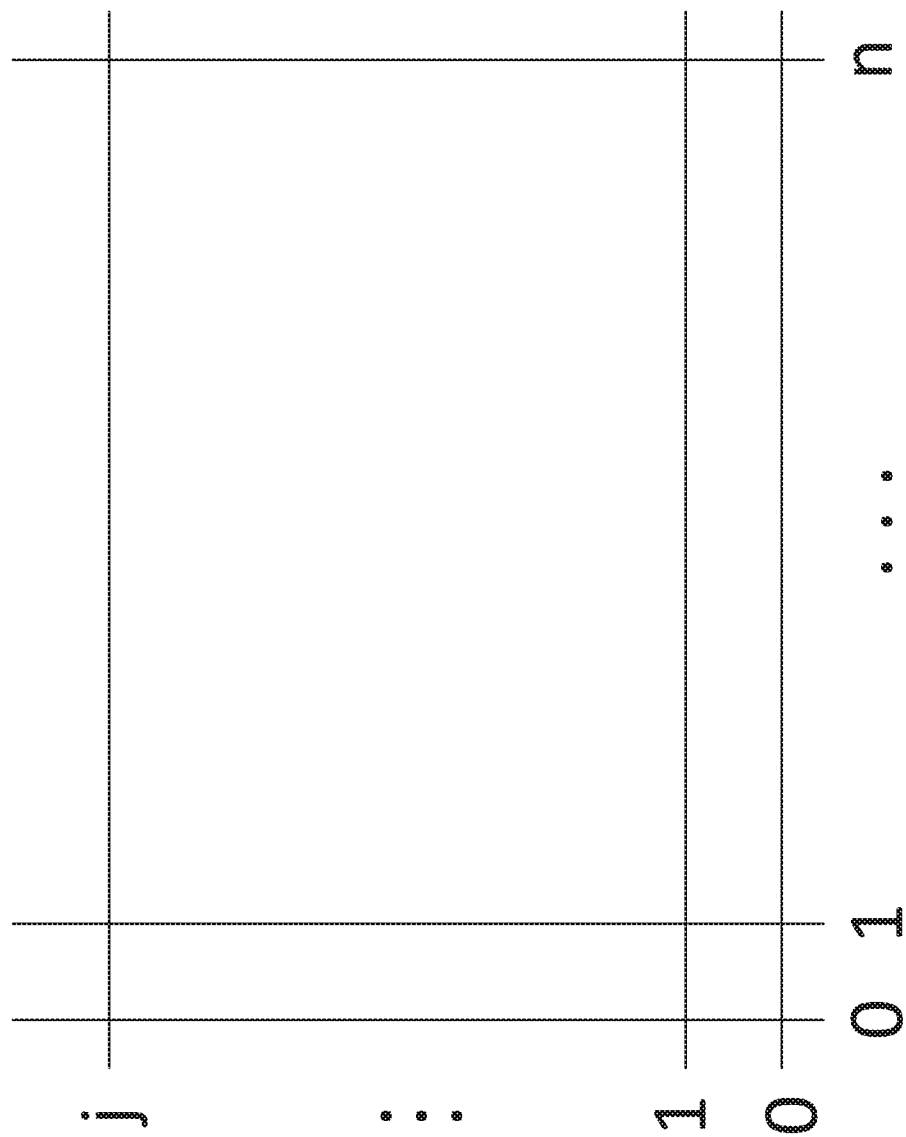
FIG. 2 is a preferred embodiment of a matrix for use with the computing system of this invention.
Figure 3:
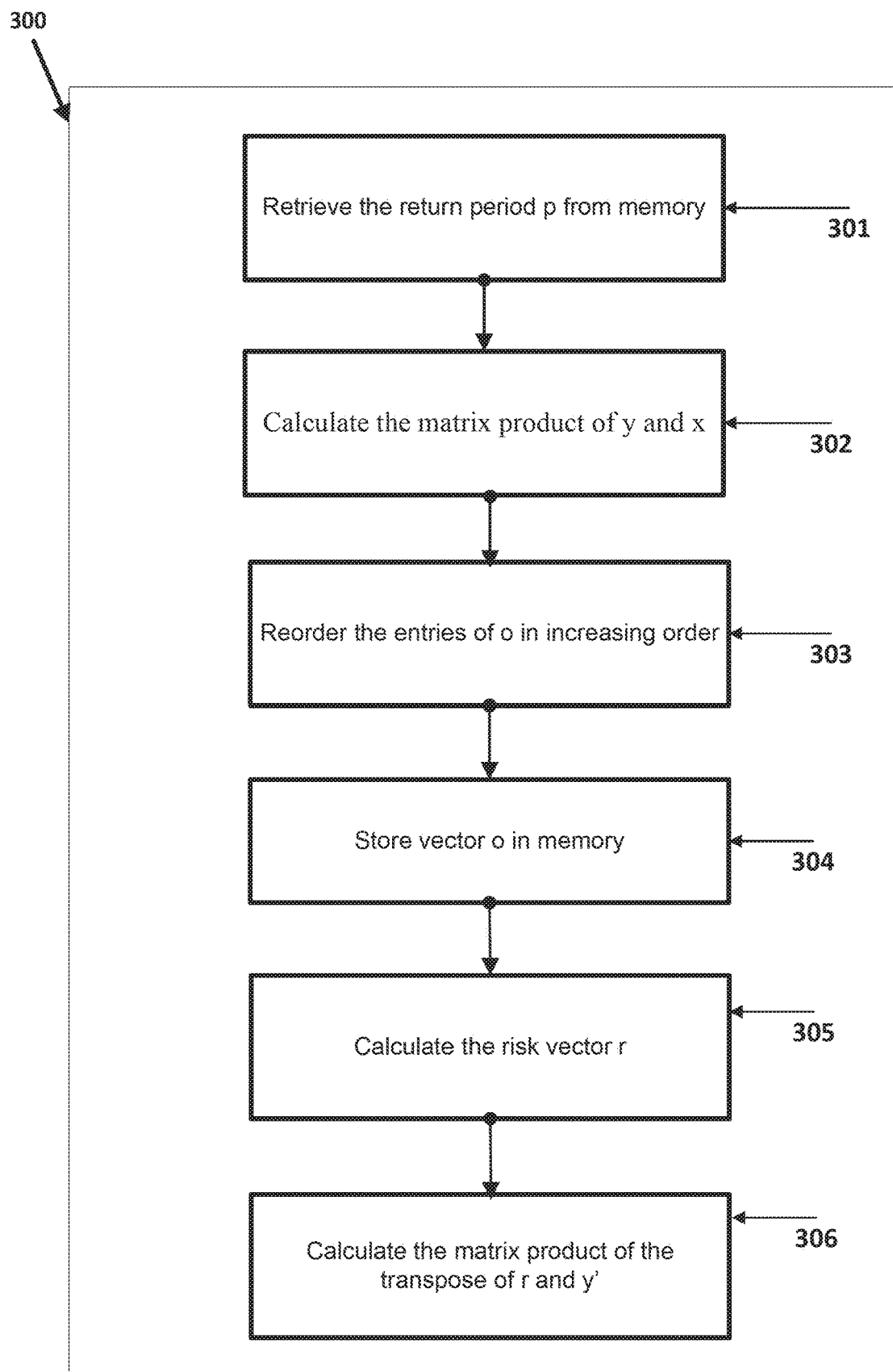
FIG. 3 is a preferred embodiment of a flow chart algorithm that can be used with this invention.
Figure 4:
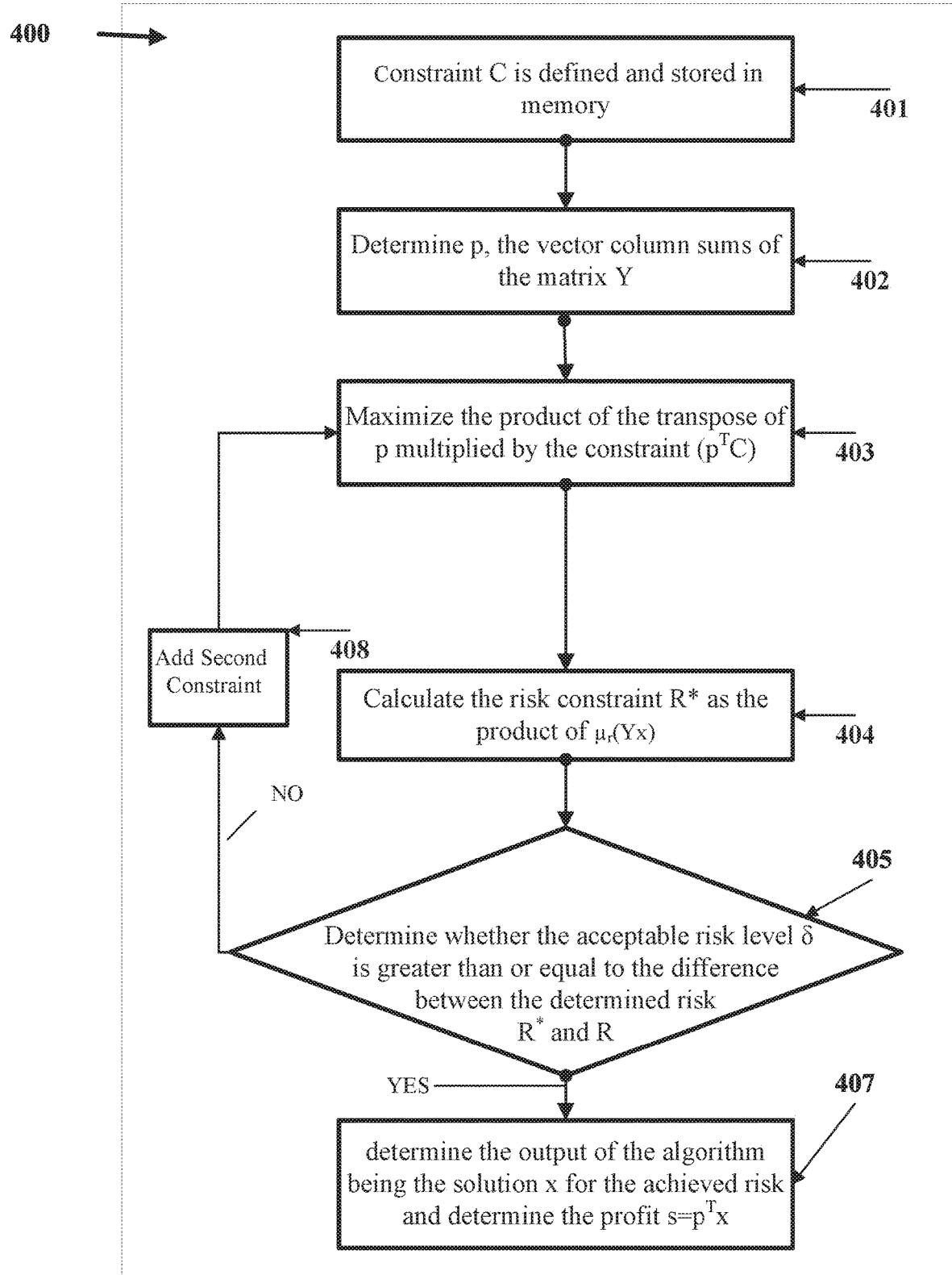
FIG. 4 is a preferred embodiment of a flow chart algorithm for the portfolio optimization tool of this invention.

The processor 118 may be programmed to evaluate a portfolio with the algorithms as shown in FIGS. 3 and 4. The algorithms of FIGS. 3 and 4 can be stored in the memory 130, 132 as executable instructions. A portfolio of financial instruments can be inputted into the computing system, received and processed by the processor, and stored in the memory along with a number of scenarios. A nonlimiting example of a financial instrument is an insurance or reinsurance policy. A scenario comprises an insurance event such as a hurricane, earthquake, flood, typhoon, mud slide, avalanche, wind storm, hail storm, ice storm, snow event, or fire and a severity for the event. The severity may indicate the amount of expected damage. Each financial instrument in the portfolio can have an expected value for each scenario. For some scenarios, the value is negative due to a catastrophic loss associated with the scenario. However, the expected instrument value is typically positive because the premiums collected are more than the expected loss for a scenario. This value for each instrument for a particular event can be inputted into the computing system, received and processed by the processor, and stored in the memory or calculated by the processor with the input device. The processor can form a scenario matrix Y having n columns with each column corresponding to a particular financial instrument in the portfolio, and having J rows with each row corresponding to a different scenario. Each entry in the matrix represents the value of the financial instrument in that column for a particular scenario. The sum of the columns represents the expected value of the instruments for different scenarios. The sum of each row represents the portfolio value for each scenario. The processor may be programmed to calculate and store in memory an outcome vector that comprises the sum of the rows; the processor can store the row summations in memory in matrix denoted as y. An example of the matrix is shown in FIG. 2.

The processor can be programmed with an algorithm 300 to determine the risk of the portfolio by using the "Conditional Value-at-Risk (CVaR)" also called the "Tail Value-at-Risk (TVaR), as described in Pavlo Krokhmal, Jonas Palmquist, and Stanislav Uryasev, Portfolio Optimization with Conditional Value-at-Risk Objective and Constraints, *Journal of Risk,* 4:11-27 (2002), as shown in FIG. 3. For a given position vector "x", the processor 300 can determine the CVaR for a return period ρ (provided that the number of scenarios J is a multiple of the return period ρ) by executing the following steps:

1. Retrieving the return period "ρ" from memory at 301,
2. Obtaining the outcome vector "o" by calculating the matrix product of Y and x at 302
3. Reordering the entries of o in increasing fashion to obtain the ordered outcome vector "o'" at 303,
4. store the vector o' in memory at 304,
5. Calculating the risk vector "r" for each scenario as follows at 305:

$$r_j = \begin{cases} -\rho/J \text{ for } i = 1, 2, \ldots, J/\rho \\ 0 \text{ for } i = j/\rho + 1, j/\rho + 2, \ldots, J \end{cases}.$$

Here "J" embodies the number of scenarios.

6. At 306, the processor can then determine the CVaR by calculating the matrix product of the transpose of r and o', which is provided as rTo'.

The processor can be programmed with the algorithm 400 in FIG. 4, which is stored in memory to optimize the portfolio by optimizing the profit for a range of risk values. At step 401, a constraint C is defined and stored in memory. The constraint C can be input into the computing system with the input mechanism or determined by the processor. In a preferred example, the constraint C reflects how much the shares in insurance policies can realistically be varied by. If the share in a particular policy can be expected to be grown by up to 20% or shrunk by up to 10%, the constraint would be represented as: 0.8 less than or equal to x less than or equal to 1.2, where x embodies the position for this policy. There are many other constraints, but in this algorithm, only one constraint above is selected at step 401. The preferred embodiment of the other constraints is an acceptable risk level. At step 402, the processor can be programmed to determine the vector column sums of the matrix Y and this summation can be represented by "p." The product ($p^Tx$) of the transpose of p multiplied by the position vector x constraint yields the expected profit of a position vector x.

This vector x can be calculated in the following step 403, the processor can be programmed to maximize the product of the transpose of p multiplied by the constraint ($p^T x$). By doing so a position vector x is determined. The techniques to perform this step are well known and referred to as linear programming. A preferred example to perform this step is the open source software lp_solve 5.5: http://lpsolve.sourceforge.net/.

The processor 400 can be programmed to compare the risk R to an acceptable risk level. The risk error tolerance can be denoted δ and can be inputted with the input mechanism, processed by the computer and stored in memory, or determined by the processor. At step 404, the processor can calculate the achieved risk R*. This can be done by calculating the CVaR as described in steps 1 to 5 set forth above. At step 405, the processor can compare the risk error tolerance level δ to determine whether the risk error tolerance δ is greater than or equal to the difference between the determined risk R* and R. If the risk R is within the risk error tolerance (e.g., δ is greater than or equal the difference of R* and R), a solution has been achieved that maximizes the profit for that risk. The processor can then at 407 determine the output of the algorithm being the solution x for the achieved risk and determine the profit $s = p^T x$.

If the risk R is not within an acceptable risk error level, the processor can at step 408 add a second constraint π. An example of a second constraint is a constraint that enforces the acceptable risk level R of the portfolio on the particular position vector x at hand. The processor can then return to step 403 and continue to calculate new position vectors x and continue to add further constraints until a solution is achieved.

The inventions disclosed herein significantly reduce processing time for evaluating the portfolio matrix values for expected profit levels for a given risk and the potential number of constraints, thereby enabling portfolio managers the ability to make timely decisions on handling of financial instruments within a portfolio. In other preferred embodiments, the constraints are Transaction Cost Balance Constraints, Value Constrains, and Liquidity Constraints. Other constraints can be used.

The algorithms of this invention can be implemented in a variety of software programs. An exemplary program is provided below in the R version 3.0.2 of lpSolve software which is based on lp_solve 5.5.

```
Preset constants.
achieved.risk.tol <- 1E-6
num.scenarios <- 1E4
num.instruments <- 1000
Functions
GetRiskMetricVector <- function(return.period){
    rp.scenarios <- num.scenarios / return.period
    return(c(rep(-1 / rp.scenarios, rp.scenarios),
        rep(0, num.scenarios - rp.scenarios)))
}
Main Code
# The variables F, L, Y, p, r, delta are explained in the article.
f=100
F <- matrix(2 - rlnorm(n=num.scenarios * f), nrow=num.scenarios)
L <- matrix(runif(num.instruments * num.factors), nrow=f)
Y <- F %*% L
# As a risk metric we use the average of the CVaR 100 and the CVar 1000
r <- 0.5 * GetRiskMetricVector(100) + 0.5 *
    GetRiskMetricVector(1000)
A <- rbind(diag(nrow=num.instruments), diag(nrow=num.instruments))
b <- c(rep(1.5, num.instruments), rep(0.5, num.instruments))
p <- colSums(Y) / num.scenarios
constr.vec <- c(rep("<=", num.instruments), rep(">=",
    num.instruments))
# We set the risk constraint to the level of risk in the orriginal
    portfolio:
scenario.outcome <- rowSums(Y)
scenario.outcome <- scenario.outcome[order(scenario.outcome)]
risk.constraint <- r %*% scenario.outcome
delta <- abs(risk.constraint * achieved.risk.tol)
repeat{
lp.sol <- lp(direction="max", objective.in=p, const.mat=A,
    const.dir=constr.vec,
            const.rhs=b)
    if(lp.sol$status>0)stop("Lp solve error: ", lp.sol$status)
    scenario.outcome <- Y %*% lp.sol$solution
    new.order <- order(scenario.outcome)
    inv.new.order <- invPerm(new.order)
    r.reordered <- r[inv.new.order]
    achieved.risk <- as.vector(r.reordered %*% scenario.outcome)
    if(achieved.risk - risk.constraint < delta) break
    A <- rbind(A, as.matrix(t(r.reordered) %*% Y))
    b <- c(b, risk.constraint)
    constr.vec <- c(constr.vec, "<=")
}
cat("Risk constraint:", risk.constraint, "\r\n")
cat("Achieved risk:", achieved.risk, "\r\n")
cat("Profit:", lp.sol$objval, "\r\n")
```

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). Examples of computing systems are personal computers, laptop computers, tablets, and smart phones.

I claim:

1. A computer system comprising:
   a processor; and
   a tangible, non-transitory memory configured to communicate with the processor, the tangible, non-transitory memory having instructions stored thereon that, in response to execution by the processor, cause the processor to perform operations comprising:
   transposing, by the processor, vector column sums of an n-dimensional matrix, wherein the n-dimensional matrix includes columns and rows, wherein each of the columns correspond to an insurance policy in a plurality of portfolio scenarios, and each of the rows correspond to a scenario in the plurality of portfolio scenarios;
   determining, by the processor, a first solution by maximizing a product of the transposing of the vector column sums of the n-dimensional matrix and a first constraint;
   determining, by the processor, a conditional value at risk (CVaR);
   determining, by the processor, an accepted range of an acceptable risk based on the CVaR;

determining, by the processor, whether the first solution is within the accepted range of the acceptable risk;

if the first solution is not within the accepted range of the acceptable risk, processing, by the processor, a second constraint with the first solution to obtain a second solution; and if the first solution is not within the accepted range of the acceptable risk, determining, by the processor, whether the second solution is within the accepted range of the acceptable risk.

2. The computer system of claim 1, wherein the first constraint is a first level of risk.

3. The computer system of claim 1, wherein the first constraint is a profit margin.

4. The computer system of claim 1, wherein the first constraint includes an amount of variation allowed in shares of insurance policies.

5. The computing system of claim 1, wherein the first constraint comprises at least one of a transaction cost balance constraint, a value constraint, or a liquidity constraint.

6. The computer system of claim 1, wherein the second constraint is a second level of risk.

7. The computer system of claim 1, wherein the second constraint is a second level of risk on a position vector.

8. The computer system of claim 1, wherein the first solution is a maximum profit for the acceptable risk.

9. The computer system of claim 1, wherein the first solution is a position vector.

10. The computer system of claim 1, further comprising determining, by the processor, a profit based on the first solution.

11. The computer system of claim 1, wherein each of a plurality of portfolio scenarios comprise insurance events and a severity for each of the insurance events.

12. The computer system of claim 1, further comprising displaying, by the processor, at least one of the first solution if the first solution is within the accepted range of the acceptable risk or the second solution if the second solution is within the accepted range of the acceptable risk.

13. The computer system of claim 1, wherein a sum of the columns represents an expected value of insurance policies for the plurality of portfolio scenarios.

14. The computer system of claim 1, wherein a sum of the rows represents a portfolio value for each of the plurality of portfolio scenarios.

15. The computer system of claim 14, further comprising calculating and storing an outcome vector that comprises the sum of the rows.

16. The computer system of claim 1, wherein the determining the CVaR includes calculating a risk vector for each portfolio scenario.

17. The computer system of claim 1, further comprising determining, by the processor, the vector column sums of the n-dimensional matrix.

18. The computer system of claim 1, further comprising storing, by the processor, a plurality of portfolio scenarios and, for each instrument, an instrument value for each of the plurality of portfolio scenarios in the n-dimensional matrix, the first constraint and the second constraint.

19. A method comprising:

transposing, by a processor, vector column sums of an n-dimensional matrix, wherein the n-dimensional matrix includes columns and rows, wherein each of the columns correspond to an insurance policy in a plurality of portfolio scenarios, and each of the rows correspond to a scenario in the plurality of portfolio scenarios;

determining, by the processor, a first solution by maximizing a product of the transposing of the vector column sums of the n-dimensional matrix and a first constraint;

determining, by the processor, a conditional value at risk (CVaR);

determining, by the processor, an accepted range of an acceptable risk based on the CVaR;

determining, by the processor, whether the first solution is within the accepted range of the acceptable risk;

if the first solution is not within the accepted range of the acceptable risk, processing, by the processor, a second constraint with the first solution to obtain a second solution; and if the first solution is not within the accepted range of the acceptable risk, determining, by the processor, whether the second solution is within the accepted range of the acceptable risk.

* * * * *